(12) United States Patent
Forrester (10) Patent No.: US 7,398,094 B2
(45) Date of Patent: Jul. 8, 2008

(54) SYSTEMS AND METHODS FOR TRANSMITTING GLOBAL POSITIONING SYSTEM INFORMATION FROM A WIRELESS COMMUNICATION SYSTEM BASE STATION

(75) Inventor: Tim Forrester, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 769 days.

(21) Appl. No.: 10/051,517

(22) Filed: Jan. 16, 2002

(65) Prior Publication Data

US 2003/0134646 A1    Jul. 17, 2003

(51) Int. Cl.
*H04Q 7/20* (2006.01)
*H04M 1/00* (2006.01)
*H04B 1/38* (2006.01)

(52) U.S. Cl. ............. 455/456.5; 455/456.1; 455/456.2; 455/556.1; 455/561; 455/550.1; 455/556.2

(58) Field of Classification Search ............. 455/456.2, 455/456.5, 404.2, 433, 435.1, 427, 430, 66.1, 455/67.11, 418–420, 422.1, 456.1–456.6, 455/457–458, 466, 550.1, 556.1–556.2, 557–558, 455/560–561, 566; 342/357.09, 357.01, 342/357.06, 357.12–357.13, 357.15; 701/213, 701/215; 340/539.13
See application file for complete search history.

(56) References Cited

U.S. PATENT DOCUMENTS

| | | | |
|---|---|---|---|
| 6,097,974 A | | 8/2000 | Camp, Jr. et al. |
| 6,300,899 B1 * | | 10/2001 | King ..................... 342/357.12 |
| 6,411,811 B2 * | | 6/2002 | Kingdon et al. .......... 455/456.5 |
| 6,463,386 B2 * | | 10/2002 | Mieno et al. ................ 701/213 |
| 6,525,689 B2 * | | 2/2003 | Dooley et al. .......... 342/357.09 |
| 6,636,740 B1 * | | 10/2003 | Ramesh ................... 455/456.1 |
| 2001/0044312 A1 * | | 11/2001 | Yamane ..................... 455/456 |
| 2002/0025824 A1 * | | 2/2002 | Lin ............................ 455/456 |
| 2002/0077751 A1 * | | 6/2002 | Mieno et al. ................ 701/213 |
| 2002/0111171 A1 * | | 8/2002 | Boesch et al. ............... 455/456 |
| 2002/0168988 A1 * | | 11/2002 | Younis ....................... 455/456 |
| 2003/0125046 A1 * | | 7/2003 | Riley et al. ................. 455/456 |
| 2003/0132877 A1 * | | 7/2003 | Forrester ................. 342/357.1 |

* cited by examiner

*Primary Examiner*—Meless N Zewdu (57) ABSTRACT

A base station comprises a GPS receiver configured to periodically locate and receive information from GPS satellites, and a transmitter configured to periodically transmit the received GPS satellite information to at least one of a plurality of GPS enabled devices. The GPS enabled device receives the information, stores it, and then uses the stored information to automatically acquire GPS satellites when it receives a position request.

50 Claims, 4 Drawing Sheets

SYSTEMS AND METHODS FOR TRANSMITTING GLOBAL POSITIONING SYSTEM INFORMATION FROM A WIRELESS COMMUNICATION SYSTEM BASE STATION

BACKGROUND OF THE INVENTION

1. Field of the Invention

The invention relates generally to global positioning using the Global Positioning System (GPS) and more particularly to systems and methods for obtaining global positioning satellite information.

2. Background

A traditional GPS receiver receives and processes specially coded satellite communication signals. The satellite signals are generated from an array of satellites that comprise the GPS system. Nominally, this array consists of 24 satellites arranged in various orbits such that between 5 and 8 satellites are visible from any point on earth. GPS receivers convert the satellite signals into position, velocity, and time estimates. Four satellites are required to compute the three position dimensions (x,y,z) as well as the time.

More and more frequently wireless communication devices, such as cellular type handsets, are incorporating GPS capability. A driving factor behind the integration of GPS into wireless communication devices is the Federal Communication Commission's (FCC's) Enhanced 911 (E911) mandate. The purpose of the FCC's E911 rules is to improve the reliability of wireless 911 service and to provide emergency service personnel with location information that will enable them to provide emergency service faster and more efficiently. Wireless communication system operators are required to provide Automatic Location Identification (ALI) as part of phase II of the E911 implementation. Incorporating GPS within wireless communication devices enables wireless communication system operators to meet the phase II requirements.

Incorporation of GPS can, however, prove taxing on the limited resources of most wireless communication devices. Size, cost, memory, and processing power are all limited resources within a wireless communication device. In order to reduce the impact of incorporating GPS capability on such resources, the wireless communication devices' GPS capability is often "network assisted." In other words, the network portion of the wireless communication system provides information, such as acquisition assist (AA) or sensitivity assist (SA) information, that allows a wireless communication device to acquire, quickly and effectively, the GPS satellites needed to provide the requisite location information.

In a large-scale emergency, however, the network assist resources are likely to become inundated due to thousands of 911 calls. Such inundation is likely to cripple the positioning capabilities of wireless communication systems, just when they are needed most. Incorporating full GPS capability in wireless communication devices, thus eliminating the need for network assistance, can prevent this problem. But, as mentioned, such an approach is undesirable due to the negative impact it will have on the device's limited resources. Thus, the massive traffic created by a major disaster can cripple the ALI ability of conventional wireless communication systems and the only currently available solution overburdens already limited wireless communication device resources.

SUMMARY OF THE INVENTION

In order to overcome the problems associated with network assisted GPS capability in conventional wireless communication systems, the systems and methods described herein reduce the burden on the network by distributing the position assist capabilities throughout the network. Moreover, the systems and methods described herein allow the wireless communication device to be "primed" with assist information so that they can automatically acquire the requisite GPS satellites upon receiving a position request. Thus, for example, the position assist capability can reside within base stations in the communication system. The base stations can then periodically transmit the position assist information to wireless communication devices within the communication system. The information can be stored in the devices, then when one of the devices receives a position request, it can automatically access the stored information and quickly acquire the appropriate GPS satellites without accessing the network portion of the communication system.

While the systems and methods described herein are particularly advantageous during a large-scale emergency, they also provide advantages during less critical operation. With this in mind, other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1:
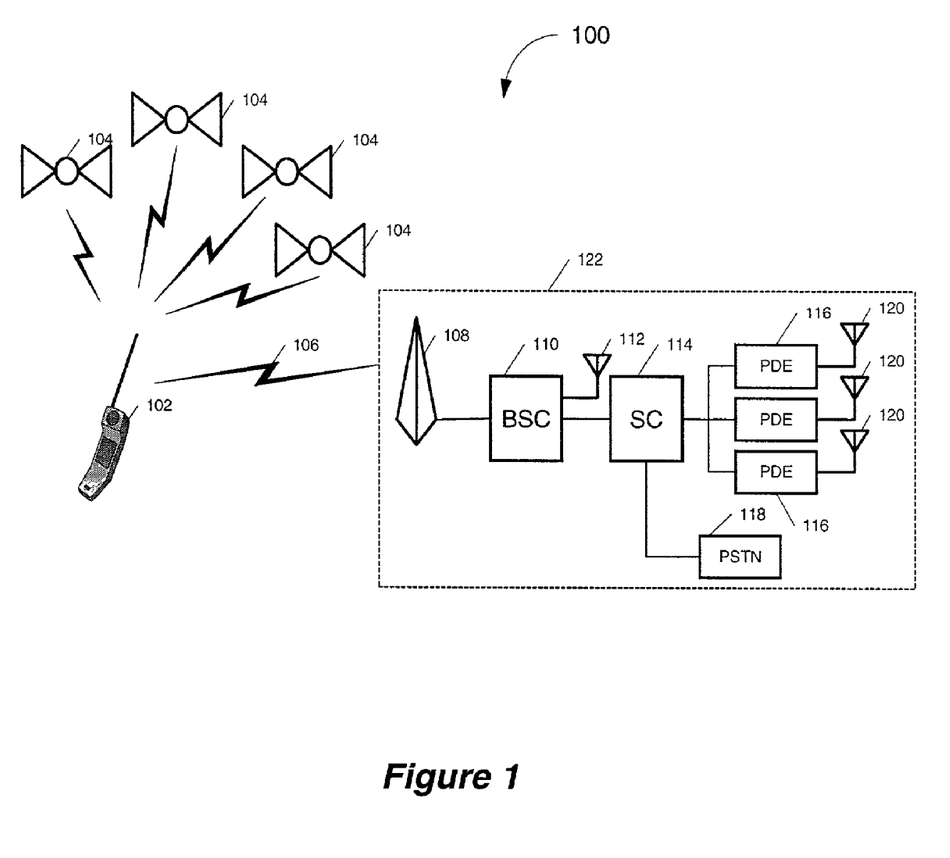
FIG. 1 is a diagram illustrating one example embodiment of a wireless communication system configured in accordance with the invention.

FIG. 1 is a diagram illustrating a "location enabled" wireless communication system 100 in accordance with the systems and methods described herein. In system 100, a plurality of wireless communication devices, of which device 102 is presented as an example, communicate over a wireless communication channel 106 with a plurality of base transceiver stations (BTSs), of which BTS 108 is presented as an example. Each BTS 108 is interfaced with a base station controller (BSC) 110, which in turn is interfaced with a switching center 114. Switching center 114 controls communication between wireless communication devices 102 and between devices 102 and the Public Switched Telephone Network (PSTN) 118.

While system 100 in general most resembles a Wireless Wide Area Network (W-WAN), it will be apparent that system 100 is presented by way of example only. Thus, it will be understood that the systems and methods described herein are as applicable to W-WANs as they are, for example, to Wireless Local Area Networks (WLANs), and Wireless Personal Area Networks (W-PANs). Of course, for other types of systems, the various components of system 100, such as BTS 108, BSC 110, and switching center 114, will need to be replaced in the following description by the components associated with the particular system, e.g., a service access point (SAP) in a W-LAN. The systems and methods described herein are not, however, dependent on any particular type of system or any particular system architecture. Further, the systems and methods described herein are applicable regardless of whether system 100 is primarily used for data communication, voice communication, or both, although for purposes of the discussion that follows it will be assumed that system 100 is used primarily for voice communication.

Figure 2:
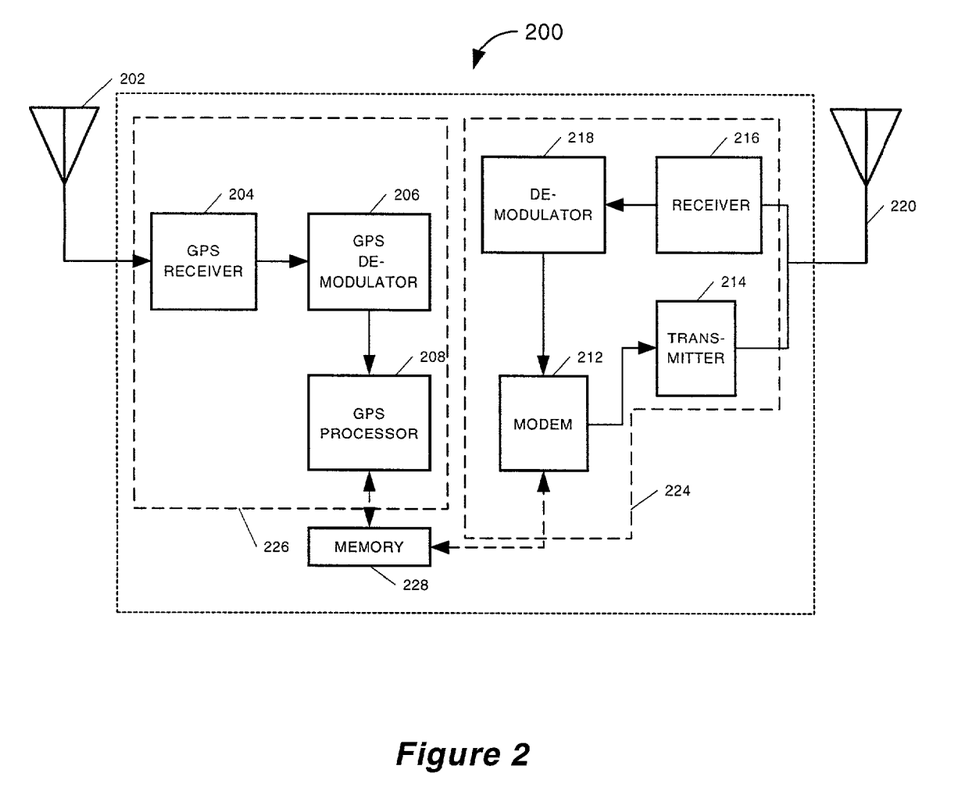
FIG. 2 is a diagram illustrating one example embodiment of a wireless communication device that can be used in the system of FIG. 1 in accordance with the invention.

Device 102 includes a GPS receiver (not shown) so that device 102 can receive position information from GPS satellites 104. It will be assumed that device 102 is a wireless handset; however, device 102 can just as easily be a laptop, or some other type of portable computer, a Personal Digital Assistant (PDA), or some other mobile or fixed electronic device that is enabled both with a GPS receiver and with the appropriate software and hardware to communicate over channel 106. With this in mind, FIG. 2 is a logical block diagram illustrating one example embodiment of a device 200 configured in accordance with the systems and methods described herein. As can be seen, device 200 includes a GPS receiver 226 configured to receive information from GPS satellites 104, and a wireless communication transceiver 224 configured to allow device 200 to communicate over communications channel 106.

Wireless communication transceiver 224 comprises receiver 216, which is configured to receive wireless communication signals from antenna 220. Receiver 216 is also preferably configured to filter and amplify the received signals. The received signals are then sent to demodulator 218. Demodulator 218 demodulates the received signal in order to generate a baseband information signal. Typically, demodulator 218 comprises two stages: the first stage steps the frequency of a received signal down from a Radio Frequency (RF), used for transmitting signals over channel 106, to an Intermediate Frequency (IF). The IF frequency signal is then stepped down, in the second stage of demodulator 218, to baseband. The baseband information signal is then sent to modem 212. Transceiver 224 also includes transmitter 214, which is configured to transmit wireless communication signals via antenna 220 generated by modem 212.

Modem 212 preferably includes various circuits for controlling the operation of handset 200 in general, and in particular for controlling communication using transceiver 224. Thus, Modem 212 can include various analog-to-digital (A/D) and digital-to-analog (D/A) converters, processors, Digital Signal Processors (DSPs), Vocoders, and peripheral control circuits as required by a particular device 200. Alternatively, some or all of these circuits can be included in device 200 as stand alone components or as components incorporated into the various components of transceiver 224.

Device 200 also preferably includes memory 228. Memory 228 can be used to store the software instructions used by both GPS receiver 226 and communication transceiver 224 as well as to store position assist information as described below. Thus, memory 228 can comprise a single memory device or a plurality of devices as required by the particular implementation of device 200.

Device 200 also includes GPS processor 208 configured to process GPS signals received via antenna 202. The received signals are preferably filtered and amplified in GPS receiver 204 and demodulated in GPS demodulator 206. Thus, GPS processor 208 can be configured to generate position information when requested without the aid of a network based position determination. Accordingly, the implementation of FIG. 2 can overcome problems associated with network based position determination, such as increased traffic and a limited operating range. But, as mentioned, including a full GPS receiver in handset 200 drives up the cost, complexity, and size of device 200 and can also have other negative effects such as reduced battery lifetime.

As such, it is preferable that network portion 122 of system 100 provide position assist information to device 200. Thus, switching center 114 can be interfaced with one or more Position Determination Entities (PDEs) 116, which include GPS receivers (not shown) for receiving information from GPS satellites 104 via antennas 120. GPS receiver 226 can then be configured to decode satellite signals from satellites 104. The decoded satellite signals can then be sent to a Position Determination Entity (PDE) 116. PDE 116 can then determine the position of device 200 from the decoded satellite signals and this information can be transmitted back to device 200, where it can, for example, be displayed on device 200 via a display (not shown).

For example, if the subscriber wants to know his position, he can input a position request into device 200 via a user interface (not shown). Device 200 then acquires satellite signal information from GPS satellites 104 using GPS receiver 226, which decodes the satellite signals. Device 200 transmits the decoded signals to PDE 116 over communication channel 106. PDE 116 generates the position information from the decoded signals and transmits the position to device 200, where it is displayed to the subscriber. Importantly, PDE 116 can also be used to provide device 200 with position assist information, such as AA and SA information, to help device 200 acquire satellites 104. Position assist information, such as AA and SA, will be discussed more fully below.

By incorporating the GPS processing capabilities in PDE 116 instead of device 200, the cost, complexity, and size of device 200 can be reduced while offering enhanced GPS performance due to the greater computational power of the PDE. Since there is constant pressure to reduce the cost, complexity, and size of wireless communication handsets, this networked based approach has distinct advantages. There are, however, important disadvantages. For example, the network based approach increases the network traffic in system 100, which reduces system capacity, meaning fewer users can use the system. This can be especially problematic during a large-scale emergency when there are thousands of 911 calls, which under the E911 mandate will initiate a position determination for each device 200 as part of the ALI implementation. Thus, while network based position determination is advantageous, the resulting network traffic in system 100 must be reduced within system 100 to avoid over burdening network portion 122 of system 100, in particular PDEs 116.

To this end, BSC 110 in system 100, unlike in conventional systems, can include a GPS receiver (not shown) configured to receive information from satellites 104 via antenna 112. BSC 110 is preferably configured to generate position assist information, such as AA and SA information, from the received information and to periodically transmit the position assist information to device 102. Thus, device 102 is primed with position assist information. If device 102 subsequently receives a position request, it preferably is configured to automatically access the position assist information and to use the information to acquire the appropriate GPS satellites 104 and to determine the position of device 102 from the GPS satellite information. In this manner, network traffic is reduced, as is the burden on PDEs 116.

Preferably, BSC 110 uses some type of control channel that is already part of wireless communication system 100 to transmit the position assist information to device 102. For example, if system 100 is a PCS system, then the PCS common control channel (CCCH) can be used to transmit the position assist information to device 102.

There are several ways in which position determination can be carried out in accordance with the systems and methods briefly described above. Several exemplary methods are described below in more detail. But first, it should be noted that a position request can be generated for a variety of reasons. As described, a position request can be generated in response to a 911 call as part of the ALI requirement. Alternatively, the user can request his position, which is also described above. But in addition, wireless communication system operators can also provide various services that will push information onto a subscriber's wireless communication device 102 based on their location. Such services require that the subscriber's position be determined. In general, it will be understood that position requests can be initiated in a variety of ways and for a variety of reasons. The above, therefore, are intended to simply serve as examples.

Figure 3:
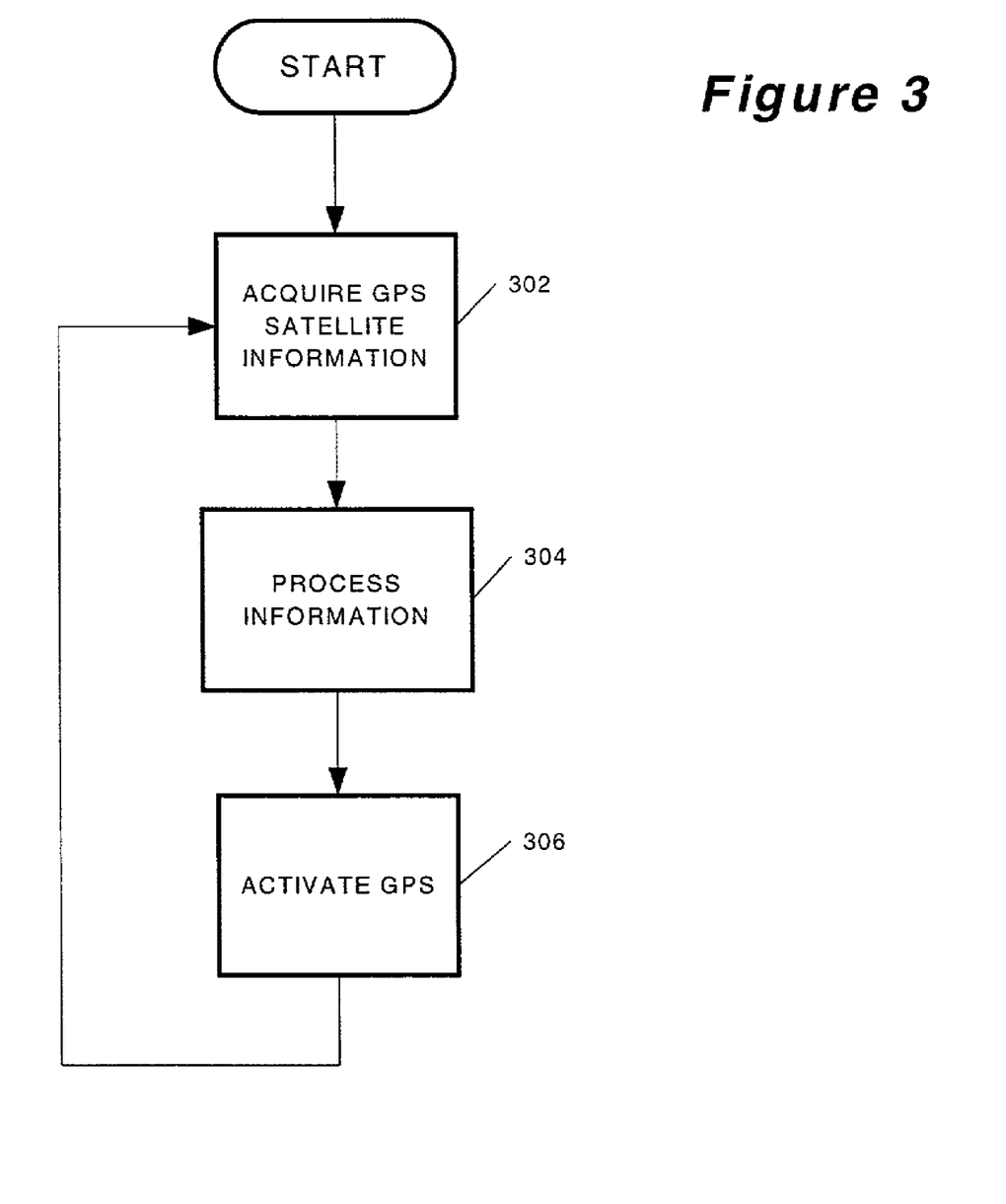
FIG. 3 is a flow chart illustrating one example embodiment of a method for assisted position determination within the system of FIG. 1 in accordance with the invention.

FIG. 3 illustrates one example method whereby the network can prime a wireless communication device 102 with position assist information in accordance with one embodiment of the systems and methods described herein. First, in step 302, BSC 110 receives satellite information from GPS satellites 104 using antenna 112 and the associated GPS receiver (not shown). In step 304, BSC 110 preferably processes the received GPS satellite information in order to derive the requisite position assist information, such as AA and SA information. Thus, it is preferable that BSC 10 include the processing hardware and software required to process the received GPS satellite information. Then, in step 306, the processed information is periodically transmitted to device 102.

In a conventional system, PDEs 116 track GPS satellites 104 using an almanac stored in PDEs 116. The almanac informs PDEs 116 as to which satellites 104 are visible from different positions on earth at any given time. Thus, in a conventional system, when a device 102 receives a position request, it initiates communication with a PDE 116 to determine which satellites are visible. PDE 116 responds with AA information telling device 102 which satellites 104 to look for as well as SA information, which assists device 102 to acquire satellites 104 when the signals from satellites 104 are excessively attenuated due to interference, such as when device 102 is inside a building.

Normally, a GPS receiver, such as receiver 226, will receive signals with signal levels as low as approximately −130 dBm. But inside a building, for example, the signal levels received by device 200 from satellites 104 can be as low as −150 dBm or lower. The SA information allows device 200 to increase the sensitivity of receiver 226 so that it can receive signals as low as approximately −150 dBm. Thus, the AA and SA information allows device 200 to quickly, preferably in 2 seconds or less, acquire GPS satellites 104 in order to make a position determination.

The main limitation on the sensitivity of GPS receiver 226 is the integration time that receiver 226 uses when receiving signals from satellites 104. In the GPS system, three codes are used to modulate the signals sent by satellites 104. The first is the Coarse Acquisition (CA) code, which is a 1 MHz pseudo random noise code that repeats every 1023 bits, or every 1 ms. The second is the Precise (P)-code, which is a 10.024 MHz code that repeats every 7 days. The third is the navigation message, which is a 50 Hz signal consisting of data bits that describe the orbits, clock corrections, and other parameters related to each satellite 104. It is the CA code that limits the integration time because in addition to repeating every 1 ms, it may also invert every 20 m depending on system parameters that are unknown to GPS receiver 226. Therefore, receiver 226 can only normally integrate for 1 ms or less, because it never knows if the CA code is going to invert or not.

The SA code, however, lets device 102 know when the CA code is going to invert, which allows receiver 226 to use a longer integration time on the received GPS satellite signals. The longer integration time increases the sensitivity of receiver 226, which in turn allows receiver 226 to work even when the GPS satellite signals are strongly attenuated. Thus, the SA information along with the AA information, which can also include navigation information such as orbits, clock corrections, and other parameters related to each satellite 104, allow device 102 to acquire, quickly and efficiently, satellites 104 even when the signal strength is as low as −150 dBm.

In system 100 traffic within network portion 122 from messages traveling to and from PDEs 116 is reduced because the position assist function typically performed by PDEs 116 is distributed throughout the network. Specifically, in system 100 the position assist function is placed in BSC 110. Thus, BSC 110 can, in one embodiment, act as a standalone PDE. In other words, BSC 110 can include all the requisite information to allow BSC to track all GPS satellites 104 and to acquire and process (steps 302 and 304) all the required information to assist device 102 with position determination. In an alternative embodiment, PDEs 116 can be used to push information, such as what satellites should be visible, onto BSC 110 so that BSC 110 does not need to store all of the information normally stored on PDEs 116. While this has the advantage of reducing the burden on the resources of BSC 110, it also has distinct disadvantages. In particular, the latter embodiment is not preferred because PDEs 116 can, for example, be crippled due to excessive traffic during a large-scale emergency. Thus, PDEs 116 would not be available to supply information to BSC 110 just when it is required most.

In another alternative embodiment, BSC 110 can comprise full PDE capability, but also be configured to receive GPS information from PDEs 116. Thus, PDEs 116 can be used as a back-up should the BSC's GPS capability be compromised in some fashion.

Distributing the PDE capabilities within the network portion 122 of system 100 reduces traffic within that portion; however, it does not directly address the problem of increased traffic over channel 106 that is due to position determination activity. In order to reduce traffic over communication channels 106, especially during a large-scale emergency, BSC 110 is preferably configured to periodically prime (step 306) device 102 with position assist information. Priming device 102 can be accomplished in several ways. For example, in conventional wireless communication systems, device 102 is required to periodically register with BSC 110. Thus, in one embodiment, BSC 110 can be configured to also transmit updated position assist information to device 102 each time it registers.

Alternatively, BSC 110 can be configured to periodically broadcast the position assist information to all communication devices 102 within range of BTS 108. For example, most wireless communication systems use some type of control channel that includes information that allows communication devices 102 that have recently entered into communication range to acquire and communicate with network 122. Such information is typically periodically broadcast over the control channel, because network 122 does not know when such devices will enter into range. The control channel can, therefore, be used to periodically transmit updated position assist information. In which case, device 102 does not need to register with BSC 110 at all. This can lead to further advantages as described below. Regardless of the method used, however, priming device 102 with position assist information reduces network traffic throughout system 100, particularly during times of increased traffic, including over channel 106.

Figure 4:
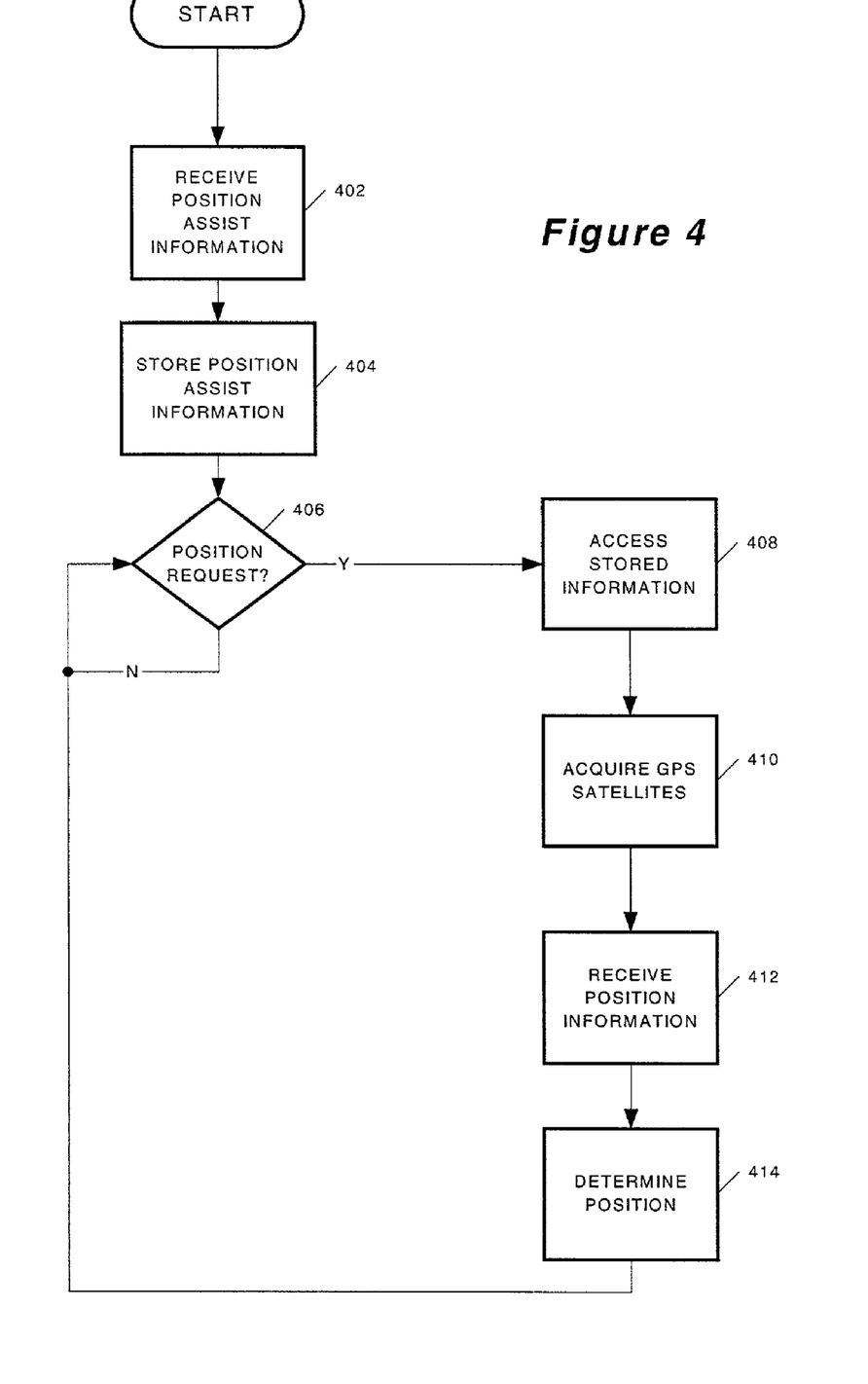
FIG. 4 is a flow chart illustrating a method of assisted position determination performed by the device of FIG. 2 in accordance with the invention.

FIG. 4 is a flow chart illustrating one example process for position determination by a wireless communication device once it is primed with position assist information in accordance with the systems and methods described herein. First, in step 402, the wireless communication device, e.g., device 200, receives the position assist information. Then in step 404, the received information is preferably stored within device 200, e.g., in memory 228. Device 200 then waits in step 406 until a position request is received. Again, a position request is essentially any action that requires the position of device 200 to be determined. If a position request is received in step 406, then in step 408 GPS receiver 226 preferably automatically accesses the position assist information stored in memory 226 and uses it to acquire GPS satellites 104 in step 410. In step 412, device 200 receives GPS signals from satellites 104 and determines the position in step 414 using information encoded in the GPS signals. The process then reverts to step 406 in which device 200 again waits for a position request. Although, in the interim, device 200 may receive (step 402) updated position assist information.

Alternatively, device 200 can decode the GPS signals and send them to the network over channel 106, where the position can be determined from the decoded GPS signals as in a conventional system. Thus, the decoded GPS signals can be forwarded to PDE 116, which can be configured to determine the position of device 200 and send it back to device 200 via the network. In another embodiment, BSC 110 can be configured with full PDE capabilities mentioned above. In this case, device 200 can be configured to send the decoded GPS signals to BSC 110 for a position determination. BSC 110 can then be configured to determine the position and transmit it back to device 200.

As mentioned previously, if device 200 does not need to register with the network in order to receive the position assist information, then the advantages of the systems and methods described herein can be extended even further. This is because GPS receivers are incorporated into numerous electronic devices, and even into cars, boats, trucks, etc. Any of these "devices" can benefit from the position assist information provided by BSC 110 in the same manner as described above. But these devices typically do not have the capability to communicate with the network, e.g., over communication channel 106. Therefore, they would not be able to register and receive the position assist information.

This is not a problem, however, if the devices are not required to register in order to receive the position assist information, e.g., if the information is broadcast by BSC 110. In this case, any device incorporating a GPS receiver can be configured to periodically receive the position assist information from BSC 110 and to use it to acquire GPS satellites 104 as described above. It is possible that BSC 110 will include a second transmitter configured to transmit over the same frequency as GPS satellites 104 so that such devices can receive the position assist information using their GPS receivers although this technique has substantial technical difficulties. Alternatively, these devices can include a second receiver configured to operate at the same frequency used for communication over channel 106 so that they can receive the position assist information broadcast by BSC 110. Often, however, these devices will suffer from the same resource limitations as wireless communication devices. Therefore, it is generally easier to include a second GPS transmitter in BSC 110, since the BSC's resources are not as limited. Further this second GPS transmitter can be used to augment the existing GPS constellation and thus improve accuracy and coverage in an urban environment.

Incorporating a second transmitter into BSC 110 can be problematic depending on the frequency used for communication over channel 106. Fortunately, newer communication systems often use frequencies in the 1 and 2 GHz range, which is close in frequency to that used by GPS satellites 104, i.e., approximately 1.5 GHz. Therefore, incorporating a second transmitter into BSC 110 in order to broadcast position assist information to a variety of devices is feasible in many communication systems. Thus, the advantages described above, i.e., fast satellite acquisition even at low signal levels, can be extended to a variety of devices. This can be advantageous because there are costs associated with including network assisted GPS service into a wireless communication system; however, the wireless communication system operator does not generate any revenue from E911 service. Therefore, the operator must develop other GPS related services to cover the cost of including network assisted GPS capabilities within his system. One way to generate such revenue is to provide network assist information to these other types of GPS devices.

Thus, the position determination capabilities of all types of GPS enabled devices can be enhanced through network assisted positioning in accordance with the systems and methods described herein, which not only leads to enhanced positioning performance, but can also increase revenue for the operators of wireless communication systems. Moreover, the enhanced capabilities will not be negatively impacted during a large-sale emergency, when they are needed most.

Again, it will be understood that the systems and methods described herein are as applicable to W-WANs as they are to Wireless Local Area Networks (W-LANs), and Wireless Personal Area Networks (W-PANs). Further, the systems and methods described herein are applicable regardless of whether system 100 is primarily used for data communication, voice communication, or both. And, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for providing position assist information from a base station, comprising:
   receiving, from a GPS satellite, GPS satellite information through an antenna at the base station;
   transmitting, from the base station and not in response to a position request, the received GPS satellite information to a GPS enabled device;
   receiving, from the GPS enabled device, decoded position signals generated by the GPS enabled device using the GPS satellite information; and
   transmitting, from the base station to the GPS enabled device, the position of the GPS enabled device determined from the decoded position signals.

2. The method of claim 1, wherein the GPS satellite information is transmitted periodically.

3. The method of claim 1, further comprising periodically locating GPS satellites, wherein the GPS satellites information is periodically received from the located GPS satellites.

4. The method of claim 3, further comprising processing the received GPS satellite information and transmitting the processed information to the GPS enabled device.

5. The method of claim 1, further comprising determining, at the base station, the position of the GPS enabled device based on the decoded position signals.

6. The method of claim 1, further comprising transmitting the satellite information to the GPS enabled device each time the GPS enabled device registers with the base station.

7. The method of claim 1, wherein the transmitted satellite information includes access assist information.

8. The method of claim 1, wherein the transmitted satellite information includes sensitivity assist information.

9. The method of claim 1, further comprising:
sending the decoded position signals to a position determination entity;
receiving the position of the GPS enabled device determined from the decoded position signals from the position determination entity; and
transmitting the determined position to the GPS enabled device.

10. A method for receiving position assist information from a base station, comprising:
receiving, at a GPS enabled device, from the base station, a GPS satellite information not transmitted in response to a position request, the GPS satellite information received through an antenna at the base station;
storing the received GPS satellite information at the GPS enabled device;
receiving, at the GPS enabled device, a position request from the base station;
acquiring the GPS satellite using the stored GPS satellite information in response to the received position request from the base station;
receiving position signals from the acquired GPS satellite;
decoding the received position signals to generate decoded position signals;
transmitting the decoded position signals to the base station; and
at the GPS enabled device, receiving from the base station, a position determined from the decoded position signals.

11. The method of claim 10, wherein the GPS satellite information is received from the base station periodically.

12. The method of claim 10, further comprising registering with the base station, and receiving the GPS satellite information during the registration.

13. The method of claim 10, further comprising adjusting a correlation time based on the stored information in order to improve the chances of acquiring the GPS satellites.

14. The method of claim 10, wherein the received satellite information includes access assist information.

15. The method of claim 10, wherein the received satellite information includes sensitivity assist information.

16. A base station, comprising:
a GPS receiver configured to receive information from, GPS satellites and locate a position of a GPS enabled device;
a transmitter configured to transmit the received GPS satellites information to the GPS enabled device, wherein the transmission is not associated with a position request from the GPS enabled device;
a receiver configured to receive decoded position signals from the GPS enabled device; and
wherein the base station is configured to determine a position of the GPS enabled device based on the received decoded position signals, and to transmit the determined position signals to the GPS enabled device.

17. The base station of claim 16, wherein the GPS receiver is configured to locate the GPS satellites periodically.

18. The base station of claim 16, further comprising a processor configured to process the received GPS satellite information, wherein the transmitter is configured to transmit the processed information to the GPS enabled devices.

19. The base station of claim 16, further comprising a network interface configured to interface the base station with a position determination entity, wherein the base station is configured to receive GPS satellites information from the position determination entity through the network interface.

20. The base station of claim 16, further comprising a receiver configured to receive registration requests from the GPS enabled device, wherein the base station is configured to transmit the GPS satellite information in response to the registration request.

21. The base station of claim 16, wherein the transmitted satellite information includes access assist information.

22. The base station of claim 16, wherein the transmitted satellite information includes sensitivity assist information.

23. The base station of claim 16, further comprising a position determination entity, wherein the position determination entity is configured to determine the position from the decoded position signals.

24. The base station of claim 16, further comprising a network interface configured to interface the base station with a position determination entity, the base station configured to:
send the decoded position signals to the position determination entity through the network interface;
receive the position of the GPS enabled device determined from the decoded position signals from the position determination entity through the network interface; and
transmit the determined position to the GPS enabled device.

25. The base station of claim 16, wherein the transmitter is configured to transmit the received GPS satellite information to the GPS enabled device over a control channel.

26. The base station of claim 25, wherein the control channel is a PCS common control channel.

27. A GPS enabled device, comprising:
a receiver configured to receive, from a base station, a GPS satellite information not transmitted in response to a position request from the GPS enabled device the GPS satellite information based on signals received through an antenna at the base station;
a memory configured to store the received GPS satellite information;
a GPS receiver configured to, in response to a position request from the base station, acquire the GPS satellite using the stored GPS satellite information, receive the position information from the acquired GPS satellites and decode the received satellite information to generate decoded position signals; and
a transmitter configured to transmit the decoded position signals to the base station, the receiver further configured to receive the position determined from the decoded position signals from the base station.

28. The GPS enabled device of claim 27, further comprising a transmitter, wherein the GPS enabled device is configured to transmit a registration request to the base station using the transmitter, and wherein the GPS satellite information is received during the registration.

29. The GPS enabled device of claim 27, further configured to adjust a correlation time based on the stored information in order to improve the chances of acquiring the GPS satellites.

30. The GPS enabled device of claim 27, further configured to receive the GPS satellite information from the base station over a control channel.

31. The GPS enabled device of claim 30, wherein the control channel is a PCS common control channel.

32. A wireless communication system, comprising:
a base station comprising:
a GPS receiver configured to receive a GPS satellite information through an antenna from the GPS satellite; and
a transmitter configured to transmit the GPS satellite information to a GPS enabled device; and
the GPS enabled device comprising:
a receiver configured to receive, from the base station, the GPS satellite information from the base station not transmitted in response to a position request;
a memory device configured to store the received GPS satellite information;
a GPS receiver configured to, in response to a position request from the base station, automatically acquire the GPS satellite using the stored GPS satellite information, receive the position information from the acquired GPS satellite and decode the received satellite information to generate decoded position signals
a transmitter, configured to transmit the decoded position signals to the base station, the receiver further configured to receive, from the base station, a GPS enabled device position determined from the decoded position signals.

33. The wireless communication system of claim 32, further comprising a position determination entity, wherein the base station further comprises a network interface configured to interface the base station with the position determination entity, and wherein the base station configured to receive the GPS enabled device position from the position determination entity through the network interface.

34. The wireless communication system of claim 32, wherein the base station further comprises a processor configured to process the GPS satellite information, and further configured to transmit the processed information.

35. The wireless communication system of claim 32, wherein the base station further comprises a receiver configured to periodically receive registration requests from the GPS enabled device, and further configured to transmit the GPS satellite information in response to the registration request.

36. The wireless communication system of claim 32, wherein the GPS satellite information includes at least one of access assist information and sensitivity assist information.

37. The wireless communication system of claim 32, wherein the transmitter in the GPS enabled device is further configured to periodically transmit a registration request to the base station, and wherein the GPS satellite information is received during the periodic registrations.

38. The wireless communication system of claim 32, wherein the GPS enabled device is further configured to adjust a correlation time based on the stored information in order to improve the chances of acquiring the GPS satellite.

39. The wireless communication system of claim 32, wherein the base station further comprises a full position determination entity, and wherein the position determination entity is configured to determine the GPS enabled device position from the decoded position signals.

40. The wireless communication system of claim 32, wherein the base station further comprises a receiver, the receiver configured to receive the decoded position signals from the GPS enabled device.

41. The wireless communication system of claim 40, wherein the base station is further configured to determine the position of the GPS enabled device based on the decoded position signals, and to transmit the determined position to the GPS enabled device.

42. The wireless communication system of claim 40, further comprising a position determination entity, wherein the base station further comprises a network interface configured to interface the base station with the position determination entity, the base station configured to:
send the decoded position signals to the position determination entity through the network interface;
receive the position of the GPS enabled device determined from the decoded position signals from the position determination entity through the network interface; and
transmit the determined position to the GPS enabled device.

43. The wireless communication system of claim 32, further comprising a control channel, wherein the GPS enabled device is configured to receive the GPS satellite information from the base station over the control channel.

44. The wireless communication system of claim 43, wherein the control channel is a PCS common control channel.

45. A base station comprising:
a GPS receiver to receive GPS satellite information from a GPS satellite:
a transmitter to transmit the GPS satellite information to a GPS enabled device not in response to a position request from the GPS enabled device;
a receiver to receive decoded position signals generated by the GPS enabled device using the GPS satellite information and GPS position signals received from the GPS satellite at the GPS enabled device;
a processor to determine a position of the GPS enabled device using the decoded position signals received from the GPS enabled device, the transmitter further configured to transmit the determined position to the GPS enabled device.

46. The base station of claim 45, further comprising a communications receiver configured to periodically receive registration requests from the GPS enabled device, and further configured to transmit the GPS satellite information in response to the registration requests.

47. The base station of claim 45, wherein the GPS satellite information includes an access assist (AA) information.

48. The base station of claim 45, wherein the GPS satellite information includes a sensitivity assist (SA) information.

49. The base station of claim 45, wherein the transmitter is further configured to transmit the received GPS satellite information to the GPS enabled device over a control channel.

50. The base station of claim 49, wherein the control channel is a PCS common control channel.

* * * * *